United States Patent [19]

Dotzauer et al.

[11] Patent Number: 5,215,827
[45] Date of Patent: Jun. 1, 1993

[54] POLYMER-COATED PRECAST CONCRETE

[75] Inventors: Bernhard Dotzauer, Maxdorf; Eckehardt Wistuba, Bad Durkheim; Manfred Schwartz, Ludwigshafen; Rolf Petri, Frankenthal; Bertold Bechert, Gruenstadt; Hans-Juergen Denu, Lampertheim, all of Fed. Rep. of Germany

[73] Assignee: BASF Aktiengesellschaft, Ludwigshafen, Fed. Rep. of Germany

[21] Appl. No.: 802,397

[22] Filed: Dec. 4, 1991

[30] Foreign Application Priority Data

Dec. 22, 1990 [DE] Fed. Rep. of Germany ....... 4041466

[51] Int. Cl.$^5$ ............................................. B32B 27/00
[52] U.S. Cl. ................................. 428/500; 52/309.17; 428/703; 524/4; 524/2; 526/298; 526/304; 526/316
[58] Field of Search ...................... 52/309.17; 428/500, 428/703; 524/4, 2; 526/298, 316, 304

[56] References Cited

U.S. PATENT DOCUMENTS

| | | | |
|---|---|---|---|
| 3,459,790 | 8/1969 | Smith | 430/510 |
| 3,716,399 | 2/1973 | Nitzche et al. | 428/447 |
| 4,229,503 | 10/1980 | Day | 428/451 |

FOREIGN PATENT DOCUMENTS

| | | |
|---|---|---|
| 0355028 | 2/1990 | European Pat. Off. . |
| 0383002 | 8/1990 | European Pat. Off. . |
| 2164256 | 6/1973 | Fed. Rep. of Germany . |
| 3827975 | 3/1990 | Fed. Rep. of Germany . |
| 3901073 | 7/1990 | Fed. Rep. of Germany . |
| 1595742 | 6/1970 | France . |

*Primary Examiner*—Edith Buffalow
*Attorney, Agent, or Firm*—Oblon, Spivak, McClelland, Maier & Neustadt

[57] ABSTRACT

Precast concrete which is coated with a copolymer A with a glass transition temperature of rom $-25°$ to $+30°$ C. and composed of a) from 0.1 to 10% by weight of a monomer of the formula I

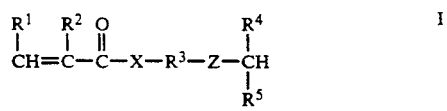

where $R^1$ and $R^2$ are each —H or $C_1$-$C_4$-alkyl,
$R^3$ is a bridge of from 1 to 20 carbons,
$R^4$ is —C(O)$R^6$, —C(O)O$R^6$ or —CN
$R^5$ is —H, —C(OR)$R^9$, —C(O)O$R^9$ or —CN
X is —O— or —N$R^7$—,
Z is a single bond, —CH$_2$—, —O—, —N$R^8$— or —O—C(O)— and
$R^6$, $R^7$, $R^8$ and $R^9$ are each —H, alkyl, aryl, alkaryl or aralkyl of up to 12 carbons, b) from 85 to 99.9% by weight of at least two monomers selected from the group comprising esters of acrylic and methacrylic acid with alcohols containing from 1 to 24 carbons, vinyl esters of carboxylic acids containing from 1 to 20 carbons, vinylaromatic compounds containing up to 20 carbons, ethylenically unsaturated nitriles containing from 3 to 6 carbons, vinyl halides, non-aromatic hydrocarbons containing from 2 to 8 carbons and at least one olefinic double bond and c) from 0 to 10% by weight of other copolymerizable tin-free monomers, is produced as described.

7 Claims, No Drawings

POLYMER-COATED PRECAST CONCRETE

The present invention relates to precast concrete tion temperature of from -25° to +30° C. and composed of a) from 0.1 to 10% by weight of a monomer of the formula I

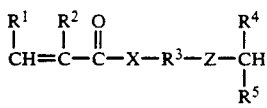

where $R^1$ and $R^2$ are each —H or $C_1$-$C_4$-alkyl,
$R^3$ is a bridge of from 1 to 20 carbons,
$R^4$ is —C(O)$R^6$, —C(O)O$R^6$ or —CN
$R^5$ is —H, —C(OR)$R^9$, —C(O)O$R^9$ or —CN
X is —O— or —N$R^7$—,
Z is a single bond, —CH$_2$—, —O—, —N$R^8$— or —O—C(O)— and
$R^6$, $R^7$, $R^8$ and $R^9$ are each —H, alkyl, aryl, alkaryl or aralkyl of up to 12 carbons, b) from 85 to 99.9% by weight of at least two monomers selected from the group comprising esters of acrylic and methacrylic acid with alcohols containing from 1 to 24 carbons, vinyl esters of carboxylic acids containing from 1 to 20 carbons, vinylaromatic compounds containing up to 20 carbons, ethylenically unsaturated nitriles containing from 3 to 6 carbons, vinyl halides, non-aromatic hydrocarbons containing from 2 to 8 carbons and at least one olefinic double bond and c) from 0 to 10% by weight of other copolymerizable tin-free monomers.

The percentages by weight are based, unless specified otherwise, on copolymer A.

Precast concrete, especially concrete roofing tiles, are produced from mortar whose consistency is such that the final shape can be given. The shape of the roofing tiles is retained even during the curing process which usually takes place at from 40° to 100° C. Concrete roofing tiles are prone to lime efflorescence; this is produced by reaction of calcium hydroxide on the surface of the roofing tiles with the carbon dioxide in the air. Calcium hydroxide may reach the surface of the roofing tiles during curing or else on weathering. The consequence is spotty, unsightly roofs. Most colored concrete roofing tiles are, after shaping but before curing, i.e. as green concrete, covered at least on their upper side with coating compositions which are intended to prevent lime efflorescence on the coating of the roofing materials, and are then stored for from 6 to 12 hours in the curing chambers in which the above-mentioned temperatures normally prevail; during this time they harden and, at the same time, the coating composition drys. Occasionally, a further application of coating composition after the hardening is carried out, with subsequent drying.

Aqueous coating compositions which are produced from a binder dispersion, inorganic aggregates such as chalk, silica powder and iron oxide pigments, additives to set the required minimum film-forming temperature (=MFT), e.g. involatile esters and hydrocarbons or plasticizers, and from pigment dispersers and antifoam agents are widely used in the manufacture of concrete roofing tiles. The pigment volume concentration (PVC) of these coating compositions is about 40%.

Used as coatings are polymer dispersions (cf. DE-A 21 64 256). However, the results achieved with copolymer coatings to date are still unsatisfactory. In addition, the blocks become heavily soiled.

German Patent Application P 40 03 909.9 and DE TM A 38 27 975 disclose processes for preventing efflorescence on mineral substrates, in which copolymers with a glass transition temperature of from $-25°$ to $+30°$ C. are used. However, the process requires the addition of special substances, namely aromatic ketones and, as additional process step, irradiation of the coating with ultraviolet light.

DE-A 39 01 073 describes a concrete roofing tile which is coated with a copolymer which contains an organotin compound as copolymerized unit. The products are crosslinked with special dicarboxylic dihydrazides. However, disadvantages of such coatings have emerged over the course of time: on exposure of these concrete roofing tiles to weathering they become soiled. In contrast to dark coatings such as anthracite-colored surfaces, this soiling is very upsetting on light or reddish coatings because it is not removed even by prolonged and heavy rain.

It is an object of the present invention to find coated precast concrete which is insensitive under practical conditions of use to the naturally occurring particles of dirt, dust and soot and provides protection from damage caused by weathering.

We have found that this object is achieved by the precast concrete defined in the first paragraph and produced as described.

Preferred embodiments of the present invention are to be found in the subclaims.

The preferably tin-free copolymer A is composed of from 0.1 to 10, preferably 1 to 6, % by weight of at least one monomer I. Advantageous substituents in the formula I are as follows:

$R^1$: H,
$R^2$: H or methyl,
$R^3$: an aliphatic or aromatic bridge such as —CH$_2$—, —C$_2$H$_4$—, —C$_4$H$_8$— and, moreover, —C$_3$H$_6$— or —C$_8$H$_{16}$—,
$R^4$: —C(O)$R^6$ such as acetyl or benzoyl or —CN
$R^5$: —H, —C(O)$R^9$ such as benzoyl and acetyl,
X: —O— or —NH—,
Z: —OC(O)— or a single bond,
$R^6$: methyl, ethyl and phenyl and
$R^7$ and $R^8$: —H and
$R^9$: methyl, ethyl and phenyl.

Compounds which may be mentioned as preferred are acetylacetoxyethyl acrylate and methacrylate

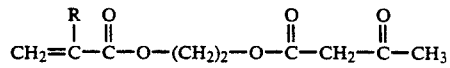

acetylacetoxybutyl acrylate and methacrylate

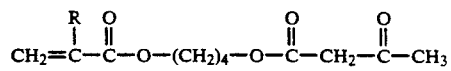

cyanoacetoxyethyl methacrylate and acrylate

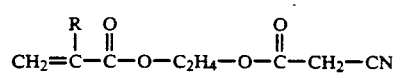

where R is H or CH₃ in each case.

Compounds of this type are disclosed in DE-A 17 93 660, U.S. Pat. No. 4 088 499 and EP-A 241 127 and can be prepared in a conventional manner by reacting a hydroxyalkyl ester, e.g. the hydroxyethyl ester, of acrylic or methacrylic acid with diketene or cyanoacetyl chloride.

Good results are also achieved with 1,1-dibenzoyl-2-methacrylamidoethane, 1,1-dibenzoyl-2-acrylamidoethane

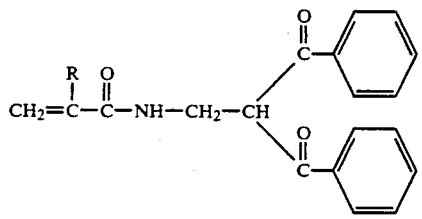

1-benzoyl-1-acetyl-2-methacrylamidoethane and 1-benzoyl-1-acetyl-2-acrylamidoethane

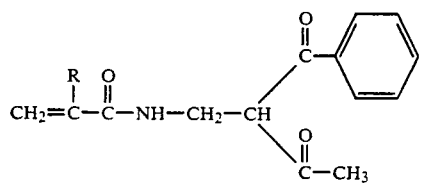

where R is H or CH₃.

Compounds of this type are disclosed in DE-A 38 19 455 and can be prepared in a conventional manner by amidomethylation of 1,3-diketones in the presence of strong acids.

The copolymer contains from 85 to 99.9, preferably 90 to 98, % by weight of the normally tin-free monomers b).

Suitable monomers b) are esters of acrylic or methacrylic acid with alcohols containing from 1 to 24 carbons. Preference is given to alcohols which, except for the oxygen atom in the OH group, do not contain any further hetero atoms, especially alkanols. Alcohols which may be mentioned are methanol, ethanol, n- or i-propanol, n-, s- and t-butanol, n-pentanol, isoamyl alcohol, n-hexanol, cyclohexanol, octanol, 2-ethylhexanol, lauryl and stearyl alcohols, benzyl alcohol and vinylethanol.

Esters of acrylic and methacrylic acid which may be mentioned are hexyl (meth)acrylate, lauryl or stearyl (meth)acrylate, cyclohexyl acrylate, phenylethyl methacrylate, methyl acrylate, ethyl acrylate and n-, s- and t-butyl (meth)acrylate, benzyl methacrylate, cyclohexyl methacrylate and, especially, methyl methacrylate, ethyl methacrylate, 2-ethylhexyl acrylate and n-butyl acrylate.

Also suitable are vinyl esters of carboxylic acids with from 1 to 20 carbons such as vinyl laurate, stearate, propionate and acetate.

Suitable vinylaromatic compounds are vinyltoluene, and p-methylstyrene, α-butylstyrene, 4-n-butylstyrene, 4-n-decylstyrene and, preferably, styrene. Examples of nitriles are acrylonitrile and methacrylonitrile.

The vinyl halides are ethylenically unsaturated compounds substituted by chlorine, fluorine or bromine, preferably vinyl chloride and vinylidene chloride.

Non-aromatic hydrocarbons with 2-8 carbons and at least one olefinic double bond which may be mentioned are butadiene, isoprene and chloroprene.

Good results are achieved when b) is a mixture of at least two monomers selected from vinylaromatic compounds and acrylic and methacrylic esters of alkanols containing from 1 to 8 carbons, for example of from 50 to 75% by weight of n-butyl methacrylate, n-butyl acrylate and/or 2-ethylhexyl acrylate and from 25 to 75% by weight of styrene and/or methyl methacrylate, where the % by weight are based on the mixture b).

Further suitable copolymerizable tin-free monomers c), i.e. different from monomers a) and b), are monomers which can, apart from C and H, contain only hetero atoms selected from N, O, S, P, Si and alkali metal. These include unsaturated carboxylic acids such as acrylic acid, methacrylic acid, itaconic acid, maleic acid, fumaric acid and crotonic acid, anhydrides such as maleic anhydride, mono- and diesters of unsaturated dicarboxylic acids with alkanols of 1 to 8 carbons, and amides of such acids, such as acrylamide, methacrylamide and the derivatives thereof substituted in the α position and/or on the nitrogen by $C_1$–$C_4$-alkyl. Also suitable are those esters and amides of (meth)acrylic acid whose ester or amide moiety contains a $C_4$–$C_{14}$-alkyl which has a —C═O group, such as diacetone acrylamide. The amides can also be substituted on the amide nitrogen by aminoalkyl groups which have from 1 to 4 carbons in the alkyl and in which the nitrogen can carry up to two $C_1$–$C_4$-alkyl radicals. The quaternary derivatives thereof are also suitable. Examples are N-(3-dimethylaminopropyl)methacrylamide and N-(3-trimethylammoniopropyl)methacrylamide chloride and the corresponding methosulfate. Olefinically unsaturated sulfonic and phosphonic acids and the salts thereof, such as vinylsulfonic acid, may likewise be mentioned. Sodium vinylsulfonate and, especially, acrylic acid, methacrylic acid, acrylamide and methacrylamide are preferred. Preferred copolymers A contain from 1 to 5% by weight of monomers c).

The monomers in group b) provide by far the greatest proportion by weight of copolymer A. The glass transition t ®mperature of a copolymer A is therefore predominantly determined by the nature and relative amounts thereof. The rules governing this are known to those skilled in the art and are therefore merely outlined briefly here: a distinction is made between hardening and softening monomers. The terms "hardening" and "softening" are applied to those monomers which are occasionally referred to in the literature inaccurately as "hard" and "soft", i.e. those monomers which, on polymerization, provide hard and softer homopolymers respectively. In this sense, hardening monomers are generally those whose homopolymers have glass transition temperatures of about 25° to 120° C., and softening monomers are those whose homopolymers have glass transition temperatures of about −60° to +25° C. Although the boundary between these monomer groups is fluid, nevertheless typical representatives of both are known.

Examples of typical hardening monomers are styrene, methyl methacrylate and tert-butyl acrylate. Examples of typical softening monomers are acrylic and methacrylic esters of non-tertiary alkanols containing from 2 to 8 carbons.

Those skilled in the art are aware that copolymers composed of softening and hardening monomers have glass transition temperatures which are between those of the respective homopolymers. This provides a straight-forward way of achieving a preset glass transition temperature by choice of the monomers and their relative amounts. Examples of typical combinations of monomers of type b) providing glass transition temperatures in the range to be achieved according to the invention are (in % of the weight of the mixture of the said monomers):

65% 2-ethylhexyl acrylate, 35% styrene,
55% 2-ethylhexyl acrylate, 45% styrene
60% 2-ethylhexyl acrylate, 20% methyl methacrylate, 20% styrene,
55% 2-ethylhexyl acrylate, 35% n-butyl methacrylate, 10% styrene,
25% n-butyl aCrylate, 25% 2-ethylhexyl acrylate, 50% styrene,
60% n-butyl acrylate, 40% styrene,
30% n-butyl acrylate, 30% 2-ethylhexyl acrylate, 20% styrene, 20% methyl methacrylate,
35% n-butyl acrylate, 30% methyl methacrylate, 35% n-butyl methacrylate.

The additional incorporation of monomers of types a and c likewise influences the glass transition temperatures of copolymers A. This is why it may be necessary to adapt the relative amounts of monomers b specified above.

The glass transition temperature can be determined by conventional methods, e.g. from measurement of the modulus of elasticity in the creep test as a function of temperature (see A. Zosel, Farbe und Lack 82 (1976), 125–134).

Copolymer A is preferably prepared by free radical emulsion polymerization in aqueous phase.

Batch processes or feed processes in which the initiator and/or monomers, which may be emulsified in water, are added in portions or continuously during the polymerization can be used (see, for example, Encyclopaedia of Polymer Science and Engineering, Vol. 6 (1986) 1 to 52). The resulting aqueous copolymer dispersions usually have a copolymer concentration, i.e. a solids content, of from 40 to 60% by weight. Emulsifiers which are usually employed are from 0.2 to 3% of the weight of the copolymer of anionic and/or nonionic emulsifiers, for example sodium dialkyl sulfosuccinates, sodium salts of sulfated oils, sodium salts of alkylsulfonic acids, sodium, potassium and ammonium alkyl sulfates, alkali metal salts of sulfonic acids, fatty acids, fatty alcohols, fatty amides and alkylphenols, the ethoxylated and/or sulfated derivatives thereof, also sodium salts of fatty acids such as sodium stearate and sodium oleate, and sulfonated alkyldiphenyl ether.

The polymer dispersions according to the invention are finely particulate, i.e. the weight average particle size is below 150 nm (determined with an analytical ultracentrifuge: W. Maechtle, Makromolekulare Chemie 185 (1984) 1025 et seq.), and a pronounced monomodal character often has beneficial effects on the barrier properties of the coatings.

At room temperature, the aqueous dispersions of the copolymers usually form shiny, clear, tough and flexible films which absorb little water. For example, after storage in water for 24 hours, less than 10, usually less than 5, % by weight are measured. They are generally free of plasticizers and film formers.

It is possible with advantage to incorporate inorganic fillers and colored pigments into the aqueous dispersions of the copolymers, and, where appropriate, to adjust the required viscosity with water, in a known manner for producing coating compositions. Examples of suitable inorganic fillers are chalk, silica flour and/or barytes. Examples of colored pigments are red and black iron oxides. The amounts of fillers and/or pigments are generally from 50 to 450% of the weight of the copolymer A.

The basic composition of a coating composition of this type is given below:

from 30 to 50% by weight, for example 40% by weight, of polymer dispersion,
from 20 to 60% by weight of fillers, for example 20% by weight of chalk and 15% by weight of silica flour,
from 2 to 10% by weight of pigment, for example 5% by weight of iron oxide pigment and
from 10 to 30% by weight, for example 20% by weight, of water.

The pH is preferably adjusted to from 6 to 8, for example with ammonia, alkanolamines such as diethanolamine, triethanolamine, propanolamine and, in particular, $Ca(OH)_2$ and $CaO$.

The pigment volume concentration of the formulation described as an example is about 45% by weight, and the viscosity is 150 mPa.s ($82 s^{-1}$), measured by the DIN 53 018 method.

Examples of suitable precast concrete are shaped items of concrete and expanded concrete, for example slabs, pipes and, especially, roofing tiles. They are coated on at least one of their surfaces. It is also possible advantageously to apply the coating to products of this type which have not hardened completely, called green concrete. The precast concrete is produced in a conventional manner from ready-mixed concrete by an extrusion process in which it is given its final shape. The coating composition is applied in a conventional manner by spraying, with a trowel or knife or by pouring, the amounts applied usually being from 50 to 500, in particular 100 to 250 $g/m^2$ measured in the dried state. The drying of the coating or coatings can be carried out in a conventional manner, at room temperature or somewhat above. For this the coated concrete is generally placed in a chamber where it is set at from 40° to 100° C., in some cases from 40° to 65° C., for 6–12 hours, and the copolymer in the coating composition is generally converted into a film.

After this process, the concrete is preferably sprayed a second time with the coating composition and dried in a drying tunnel with air circulating at about 100° C. The drying tunnel and downstream cooling section are designed so that the coating is normally converted completely into a film.

The very uniform coatings form a very effective barrier to calcium ions because even after treatment with water vapor for 10 days (coatings facing the surface of water at 60° C.) they show no lime efflorescence. The coatings are stable to freeze-thaw cycling (rapid test based on DIN 52 104).

The concrete is thus well protected from lime efflorescence. In addition, the concrete adsorbs hardly any dirt even at elevated temperatures.

Unless otherwise indicated, parts and percentages are by weight in the Examples which follow.

EXAMPLES

The copolymer dispersions of Examples 1 to 5 and the Comparative Tests 1V, 2V and 5V listed in the Table were prepared by the following general method.

In a conventional emulsion feed process, a 50% strength aqueous dispersion of a copolymer is prepared from the monomer mixture indicated in the Table, employing 0.4% by weight of sodium peroxodisulfate as initiator and 1.5% by weight of the sodium salt of a bisulfate of an iso-nonylphenol ethoxylate with an average of 25 ethylene oxide units and 0.5% by weight of an iso-nonylphenol ethoxylate with an average of 25 ethylene oxide units, in each case based on the monomers. The polymerization is carried out at 85° C.

After cooling to room temperature, the pH is adjusted to 7 with a 25% strength aqueous ammonia solution.

The soiling test for polymer dispersions was deliberately carried out on unpigmented films in order to detect differences relevant to practice.

The polymer dispersion was applied as a film 200 μm thick on a cleaned glass plate. It was then dried at 70° C. for one minute. The film was then stored at room temperature for about 24 h. Soiling, stage 1

At the upper end of the film, about 1 g of powdered active carbon was applied with a metal strainer (tea-strainer) as a circular soiling with a diameter of about 5 cm. The sample was left to stand for 1 h and then the active carbon was removed by tapping on the side and briefly washed off with water. Soiling, stage 2

The end of the glass plates with the still unsoiled film was placed in distilled water for 15 minutes. After this time, the film was dried at room temperature. The water-treated part of the film was then soiled as described above. Assessment (visual)

Score 1 = no perceptible soiling
2 = slight, non-uniform soiling
3 = slight, uniform soilng
4 = heavy soiling, uniform dark area of soiling
5 = very heavy, no visible difference from untreated application (soot).

TABLE

Copolymer dispersions and test results on dispersion films

| Ex. | Composition [parts by weight] | | Glass transition temperature [°C.] | Soiling Score Stage 1 | / | Score Stage 2 |
|---|---|---|---|---|---|---|
| 1 | 55 | n-butyl acrylate | +2 | 2 | / | 2.5 |
|  | 43.5 | styrene |  |  |  |  |
|  | 1.5 | acetylacetoxyethyl methacrylate |  |  |  |  |
|  | 2.5 | acrylic acid |  |  |  |  |
| 1V | 55 | n-butyl acrylate | +1 | 4.5 | / | 5 |
|  | 45 | styrene |  |  |  |  |
|  | 2.5 | acrylic acid |  |  |  |  |
| 2 | 44 | n-butyl acrylate |  |  |  |  |
|  | 15 | 2-ethylhexyl acrylate | −5 | 3 | / | 3-4 |
|  | 38 | styrene |  |  |  |  |
|  | 3 | acetylacetoxyethyl methacrylate |  |  |  |  |
|  | 2.5 | acrylic acid |  |  |  |  |
| 2V | 46 | n-butyl acrylate | −6 | 3-4 | / | 4-5 |
|  | 15 | 2-ethylhexyl acrylate |  |  |  |  |
|  | 39 | styrene |  |  |  |  |
|  | 2.5 | acrylic acid |  |  |  |  |
| 3 | 65 | n-butyl acrylate | −3 | 2.5 | / | 3 |
|  | 32 | styrene |  |  |  |  |
|  | 3 | 1,1-dibenzoyl-2-methacrylamido-ethane |  |  |  |  |
|  | 2.5 | acrylic acid |  |  |  |  |
| 4 | 63 | n-butyl acrylate | −2 | 2 | / | 2-3 |
|  | 33 | styrene |  |  |  |  |
|  | 4 | 1-benzoyl-1-acetyl-2-acrylamidoethane |  |  |  |  |
|  | 2.5 | acrylic acid |  |  |  |  |
| 5 | 62 | n-butyl acrylate | −2 | 2 | / | 2 |
|  | 33 | styrene |  |  |  |  |
|  | 5 | 2-cyanoacetoxyethyl methacrylate |  |  |  |  |
|  | 2.5 | acrylic acid |  |  |  |  |
| 5V* | 56 | 2-ethylhexyl acrylate | −2 | 4.5 | / | 5 |
|  | 41 | styrene |  |  |  |  |
|  | 2 | tri-n-butyltin methacrylate |  |  |  |  |
|  | 2.5 | acrylic acid |  |  |  |  |

*The general method was modified in that, after adjustment to pH 7, 0.5 of adipic dihydrazide was stirred into the dispersion.

We claim:

1. Precast concrete which is coated with a tin-free copolymer A with a glass transition temperature of from −25° to +30° C. and consisting essentially of
   a) from 0.1 to 10% by weight of a monomer of the formula I

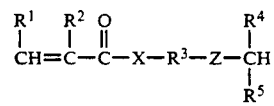

where $R^1$ and $R^2$ are each —H or $C_1$-$C_4$-alkyl,
$R^3$ is a bridge of from 1 to 20 carbons,
$R^4$ is —C(O)$R^6$, —C(O)O$R^6$ or —CN
$R^5$ is —H, —C(OR)$R^9$, —C(O)O$R^9$ or —CN
X is —O— or —N$R^7$—,
Z is a single bond, —CH$_2$—, —O—, —N$R^8$— or —O—C(O)— and
$R^6$, $R^7$, $R^8$ and $R^9$ are each —H, alkyl, aryl, alkaryl or aralkyl of up to 12 carbons,
   b) from 85 to 99.9% by weight of at least two monomers selected from the group comprising esters of acrylic and methacrylic acid with alcohols containing from 1 to 24 carbons, vinyl esters of carboxylic acids containing from 1 to 20 carbons, vinylaromatic compounds containing up to 20 carbons, ethylenically unsaturated nitriles containing from 3 to 6 carbons, vinyl halides, non-aromatic hydrocarbons containing from 2 to 8 carbons and at least one olefinic double bond and
   c) from 0 to 10% by weight of other copolymerizable monomers.

2. A concrete roofing tile as claimed in claim 1, as a roofing tile where monomer a) is at least one compound selected from acetylacetoxyethyl methacrylate, acetylacetoxyethyl acrylate, acetylacetoxybutyl acrylate, acetylacetoxybutyl methacrylate, cyanoacetoxyethyl methacrylate, cyanoacetoxyethyl acrylate, 1,1-dibenzoyl-2-methacrylamidoethane, 1,1-dibenzoyl-2- acrylamidoethane, 1-benzoyl-1-acetyl-2-methacrylamidoethane, 1-benzoyl-1-acetyl-2-acrylamidoethane, ethyl α-benzoyl-β-methacrylamidopropionate and ethyl α-benzoyl-βacrylamidopropionate.

3. Precast concrete as claimed in claim 1, where b) is selected from vinylaromatic compounds and acrylic and methacrylic esters with alkanols containing from 1 to 8 carbons.

4. Precast concrete as claimed in claim 1, which is coated with a composition which contains copolymer A and up to 450% by weight, based on copolymer A, of mineral aggregates and/or coloring pigments.

5. A process for producing precast concrete as claimed in claim 1 by applying an aqueous composition at least one surface area of the green precast concrete and subsequently drying by curing the precast concrete, wherein the aqueous composition contains a tin-free copolymer A consisting essentially of a) from 0.1 to 10% by weight of a monomer of the formula I

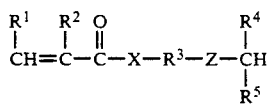

where $R^1$ and $R^2$ are each —H or $C_1$-$C_4$-alkyl, $R^3$ is a bridge of from 1 to 20 carbons,
$R^4$ is —C(O)$R^6$, —C(O)O$R^6$ or —CN
$R^5$ is —H, —C(OR)$R^9$, —C(O)O$R^9$ or —CN
X is —O— or —N$R^7$—,
Z is a single bond, —CH$_2$—, —O—, —N$R^8$— or —O—C(O)— and
$R^6$, $R^7$, $R^8$ and $R^9$ are each —H, alkyl, aryl, alkaryl or aralkyl of up to 12 carbons, b) from 85 to 99.9% by weight of at least two monomers selected from the group comprising esters of acrylic and methacrylic acid with alcohols containing from 1 to 24 carbons, vinyl esters of carboxylic acids containing from 1 to 20 carbons, vinylaromatic compounds containing up to 20 carbons, ethylenically unsaturated nitriles containing from 3 to 6 carbons, vinyl halides, non-aromatic hydrocarbons containing from 2 to 8 carbons and at least one olefinic double bond and c) from 0 to 10% by weight of other copolymerizable monomers.

6. A process as claimed in claim 5, wherein the curing of the precast concrete is followed by application of another layer of the aqueous composition and drying.

7. A process as claimed in olaim 5, wherein the composition is applied to the roofing tile in an amount such that the total application after drying is from 50 to 500 g per m$^2$.

* * * * *